Sept. 20, 1949. T. F. FREED 2,482,256
DOUGH MIXING MACHINE
Filed Feb. 7, 1945 2 Sheets-Sheet 1
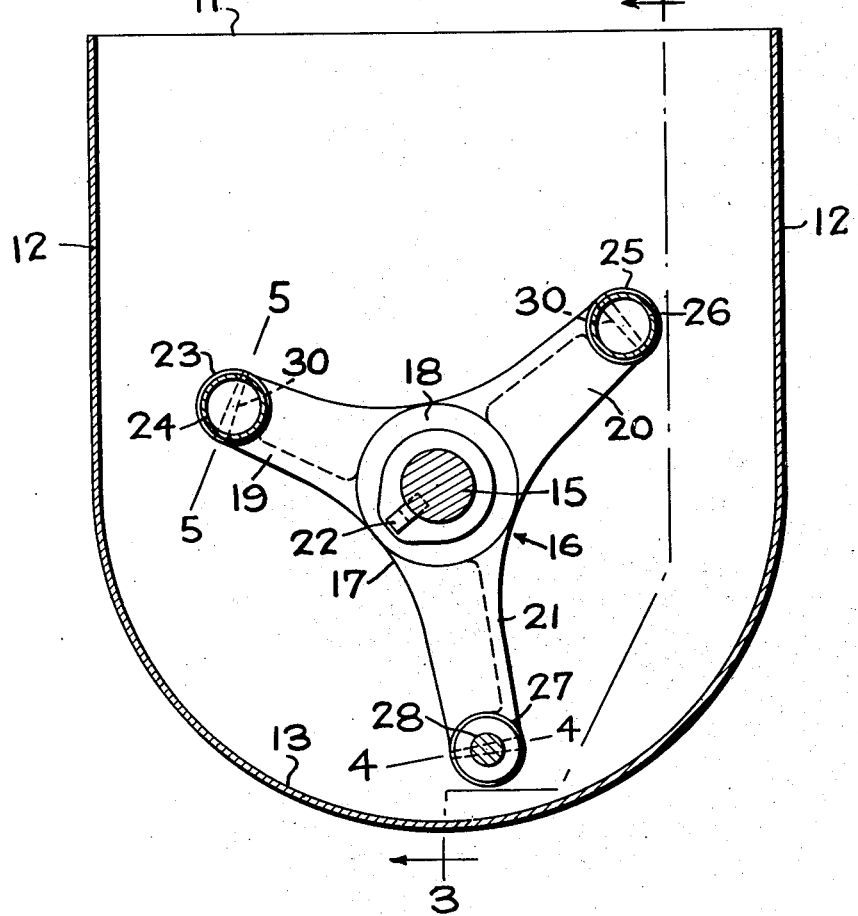
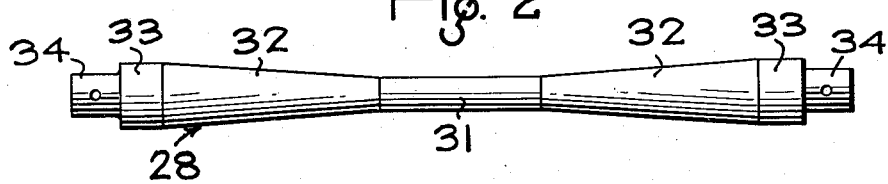
Inventor
T. F. FREED
By Malcolm F. Gannett
Attorney Sept. 20, 1949.　　　　　T. F. FREED　　　　　2,482,256
DOUGH MIXING MACHINE
Filed Feb. 7, 1945　　　　　　　　　　　2 Sheets-Sheet 2
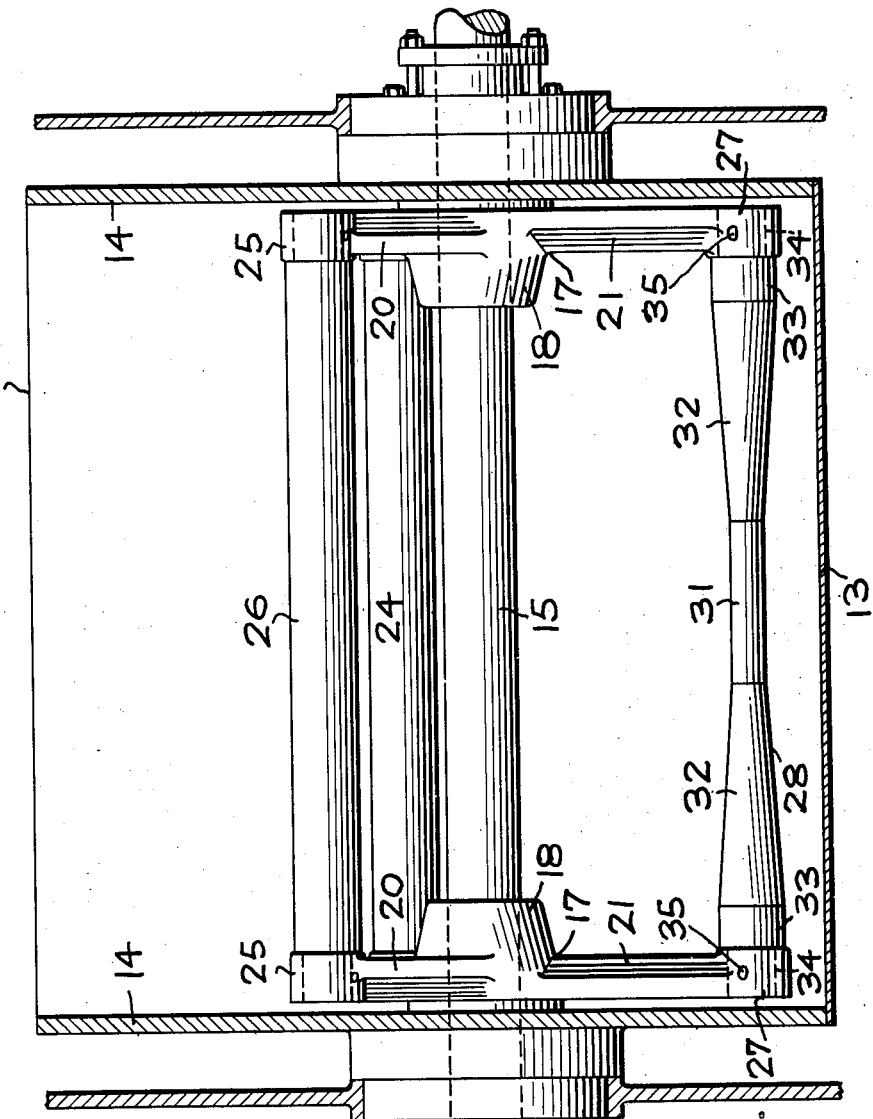
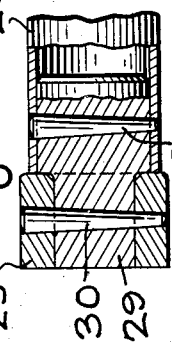
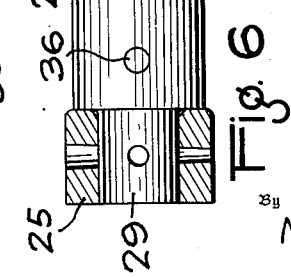
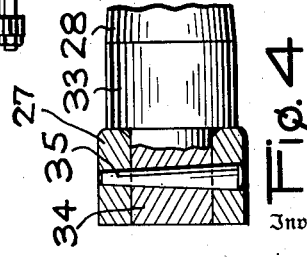
Inventor
T. F. FREED
By Malcolm F. Gannett
Attorney Patented Sept. 20, 1949

2,482,256

UNITED STATES PATENT OFFICE 2,482,256

DOUGH-MIXING MACHINE

Theodore F. Freed, York, Pa., assignor, by mesne assignments, to The Standard Stoker Company, Inc., New York, N. Y., a corporation of Delaware Application February 7, 1945, Serial No. 576,579

4 Claims. (Cl. 259—109)

1

This invention relates to machines for mixing plastic substances, and more particularly to mixing machines of the type used in bakeries for mixing bread dough and the like.

An object of the invention is to provide an improved dough mixing machine in which the mixing member or agitator which is rotatably mounted in the mixing bowl or receptacle has a straight cross bar larger at its ends than at its middle and tapering gradually from its ends towards a central cylindrical section so that the mass of dough is kept from spreading lengthwise towards the end walls of the bowl.

Another object of the invention is to provide an improved mixing machine constructed and arranged so as to be conducive to economical manufacture, maintenance and operation, together with convenience and flexibility of use whereby batches of plastic substances may be rapidly produced with uniform texture.

With the foregoing and other objects and advantages in view, the invention consists in the preferred construction and arrangement of the several parts which will be hereinafter fully described and claimed.

In the accompanying drawings:

Fig. 1 is a vertical transverse section of a mixing machine embodying the present invention;

Fig. 2 is a side elevation of the cross bar shown adjacent to the bottom of the mixing bowl in Fig. 1;

Fig. 3 is a vertical longitudinal section taken on the line 3—3 of Fig. 1;

Fig. 4 is an enlarged section taken along the the line 4—4 of Fig. 1;

Fig. 5 is an enlarged section taken along the line 5—5 of Fig. 1; and

Fig. 6 is a view similar to Fig. 5 showing the pin removed by which the end of the cross bar is fixedly secured to the arm of the agitator.

Referring to the drawings, the mixing machine comprises a receptacle or bowl 11 especially designed for mixing and kneading dough, although capable of use with other plastic substances.

The receptacle or bowl 11 is in the nature of a deep tank which forms the mixing chamber in which is contained the materials to be operated upon, said bowl being preferably formed with side walls 12, a substantially semi-circular bottom 13 and end walls 14.

The arcuate bottom 13 constitutes a working surface for the material mixed in the bowl 11.

Extending longitudinally through the mixing chamber or bowl 11 and intersecting its two end walls 14, is a rotatable shaft 15, to which is keyed

2 for unitary rotation therewith an agitator frame or agitator, generally indicated by the numeral 16.

The agitator 16 is of the bar type and includes a pair of supports or multiple armed spiders 17, one of which is disposed adjacent to one end wall 14 of the mixing chamber or bowl 11 and the other spider being disposed adjacent to the other end wall 14 of the mixing chamber or bowl 11, as shown in Fig. 3.

Each spider comprises a hub 18 through which the shaft 15 extends, and a plurality of arms 19, 20 and 21.

The two hubs 18 are rigidly connected to the shaft 15 by any suitable means, as indicated at 22, Fig. 1, so that each pair of arms 19, 20 and 21 are arranged in parallel relationship with each other. In other words, the arm 19 of one spider is arranged in alinement with the arm 19 of the other spider so that the angular relationship of the arms is the same. Similarly the arms 20 are alined with each other, and the arms 21 are likewise alined with each other.

The arms 19, 20 and 21 extend radially outward from the hubs 18, the arms 19 having a length less than the length of the arms 20, and the arms 21 having a greater length than the length of the arms 20, whereby each pair of arms has a different length, as best shown in Fig. 1.

The extremities of the arms 19 are formed with bosses 23 for the reception of the ends of a cross bar or rod 24.

Similarly the extremities of the arms 20 are formed with bosses 25 for the reception of the ends of a cross bar or rod 26.

The extremities of the arms 21 are formed with bosses 27 for the reception of the ends of a cross bar or rod 28.

The cross bars 24 and 26 may be similar in form and each comprises an elongated cylindrical member of uniform diameter throughout its length between the two supporting spiders 17. These members 24 and 26 may be constructed from tubes if desired.

The cross bars 24 and 26 extend in a substantially straight line between the spiders and each may have reduced end portions 29 mounted in the bosses, as shown in Fig. 5.

The end portions 29 of the cross bars 24 and 26 may be keyed or fixedly connected to the ends of the arms 19, 20, respectively, of the spiders, by means of pins 30 or similar means, as shown in Fig. 5, or, if so desired the pins 30 may be omitted so that the ends of the cross bars or rods 24 and 26 may be journaled in the bosses of the arms of the spiders. In the latter case the cross bars 24 and 26 are not only supported by the spiders, but are capable of rotating on their longitudinal axes (see Fig. 6).

When the cross bars 24 and 26 are formed of tubes, the end portions 29 may be constructed of separate solid members which are mounted in the ends of the tubes and secured thereto by pins 36, as shown best in Fig. 5.

The cross bar 28, on the other hand, comprises a member having a middle or central cylindrical section 31 of less diameter than the maximum diameter of the cross bar, two tapered or inclined sections 32 which extend outward in opposite directions from the middle section 31, and two cylindrical end sections composed of the sections 33 of maximum diameter and the sections 34.

The outer end sections 34 of the cross bar 28 have a diameter slightly less than the diameter of the sections 33 so that the sections 34 can be mounted in the bosses 27.

The ends 34 of the cross bar 28 are fixedly connected to the ends of the arms 21 of the spiders 17, by means of pins 35 or similar means which are mounted in alined openings in the bosses 27 and ends 34, as shown in Figs. 3 and 4.

It will thus be noted that the cross bar 28 comprises a straight member, which is cylindrical in cross section throughout its entire length, larger at its ends than at its middle and tapers gradually from its ends toward the central section 31.

The agitator 16 constitutes a rotary mixing member mounted within the bowl 11 with its axis parallel to the longitudinal axis of the bowl. The three cross bars 24, 26 and 28 are each adapted to be formed of straight material, circular in cross section throughout its entire length, all of said cross bars being arranged substantially parallel with the longitudinal axis of the bowl. Since the cross bars 24, 26 and 28 are spaced varying distances from the working surface of the bowl provided by the bottom 13, with the cross bar disposed in closest proximity to the working surface 13 of the bowl, during rotation of the agitator the cross bar 28 is adapted to prevent outer portions of the dough or plastic substance in the bowl moved by the mixing member 16 against the working surface 13 of the bowl from spreading lengthwise towards the end walls 14 of the bowl. In this way an improved dough mass can be produced, since the ingredients will be more thoroughly mixed than heretofore.

While I have described the invention in great detail and with respect to the present preferred form thereof, it is not desired to be limited thereto, since changes and modifications may be made therein without departing from the spirit and scope of the invention as defined by the following claims.

Having thus described my invention, what I claim and desire to secure by Letters Patent is:

1. In a dough-mixing machine, the combination with a mixing chamber, of a mixing member rotatably mounted therein and comprising end members, a plurality of straight rods extending between said end members, said rods being parallel with the axis of the mixing member and at different distances from said axis, all of said rods being circular in cross section, one of said rods having a larger diameter at its ends than at its middle and tapering gradually from its ends towards a central right cylindrical section.

2. In a mixing machine for a plastic substance, the combination with a bowl having a working surface and end walls, an agitator mounted for movement about a substantially horizontal axis within said bowl and including a cross bar fixedly mounted in said agitator and arranged with its axis in parallel relationship to the axis of rotation of said agitator, said cross bar throughout its length being circular in cross section and its end portions having a greater cross sectional area than its middle portion, said end portions tapering gradually from their outer ends toward said middle portion and said middle portion having a uniform cross sectional area whereby to prevent outer portions of the plastic substance moved by said agitator against the working surface of the bowl from spreading lengthwise towards the end walls of the bowl.

3. In a mixing machine, a mixing chamber and a shaft longitudinally arranged through said chamber, a pair of multiple armed spiders affixed to said shaft, and a plurality of straight cross bars mounted in said spiders in parallel relation with respect to said shaft, one of said cross bars having a larger cross-sectional area at its ends than at its middle and tapering gradually from its ends towards a central right cylindrical section, and each of said cross bars arranged at varying degrees of proximity to said longitudinal shaft, said tapering cross bar being the greatest distance from said shaft.

4. In a mixing machine of the type having a mixing chamber with side walls, an arcuate bottom wall defining a working surface and end walls, and a rotatable shaft longitudinally arranged through said chamber; an agitator comprising a pair of multiple armed spiders affixed to said shaft and positioned within the mixing chamber adjacent to the end walls thereof, and cross bars mounted in the arms of said spiders and disposed substantially parallel with said shaft, all of said cross bars being circular in cross section, one of said cross bars having a larger diameter at its ends than at its middle and tapering gradually from its ends towards a central right cylindrical section having a diameter less than the portion of the cross bar maximum diameter, each of said cross bars being arranged at varying degrees of proximity to the bottom wall of said mixing chamber, with said cross bar having the tapered portions arranged closest to the bottom wall of the mixing chamber during rotation of the agitator and adapted to prevent outer portions of the material moved by said agitator against the working surface of the mixing chamber from spreading lengthwise towards the end walls of said mixing chamber.

THEODORE F. FREED.

REFERENCES CITED

The following references are of record in the file of this patent:

UNITED STATES PATENTS

| Number | Name | Date |
| --- | --- | --- |
| 1,187,521 | Gordon | June 20, 1916 |
| 1,651,092 | Lauterbur et al. | Nov. 29, 1927 |
| 1,845,329 | Pierre | Feb. 16, 1932 |
| 1,857,361 | Davis | May 10, 1932 |
| 2,167,316 | Spangler et al. | July 25, 1939 |